United States Patent [19]

Kelsey et al.

[11] Patent Number: 5,224,284
[45] Date of Patent: Jul. 6, 1993

[54] FISHING BUOY

[76] Inventors: Stephen L. Kelsey, P.O. Box 393;
David J. Semanko, P.O. Box 292,
both of Minong, Wis. 54859

[21] Appl. No.: 832,235

[22] Filed: Feb. 7, 1992

[51] Int. Cl.⁵ .............................................. A01K 97/12
[52] U.S. Cl. ................................................... 43/17
[58] Field of Search ............................................ 43/17

[56] References Cited

U.S. PATENT DOCUMENTS

| | | |
|---|---|---|
| 2,587,190 | 2/1952 | Merriweather . |
| 2,700,238 | 1/1955 | Schrader ................................. 43/17 |
| 2,876,579 | 3/1959 | Plouffe .................................... 43/17 |
| 2,936,541 | 5/1960 | Stanford ................................. 43/17 |
| 3,024,560 | 3/1962 | Clark . |
| 3,213,561 | 10/1965 | Roemer .................................. 43/17 |
| 3,641,693 | 2/1972 | Pinnow . |
| 3,645,029 | 2/1972 | Roemer . |
| 3,973,347 | 8/1976 | Kearney . |
| 4,120,111 | 10/1978 | Young ..................................... 43/17 |
| 4,246,716 | 1/1981 | Elmer ..................................... 43/17 |
| 4,566,216 | 1/1986 | Randall .................................. 43/17 |
| 4,707,932 | 11/1987 | Sonnemaker . |
| 4,809,456 | 3/1989 | Caparelli, Jr. et al. . |
| 4,887,777 | 12/1989 | Rasmussen ............................ 43/17 |
| 4,942,687 | 7/1990 | Post ........................................ 43/17 |
| 4,993,182 | 2/1991 | Monsen . |
| 5,005,310 | 4/1991 | Rinehart . |
| 5,036,615 | 8/1991 | Lu . |

Primary Examiner—Kurt C. Rowan
Attorney, Agent, or Firm—Merchant, Gould, Smith, Edell, Welter & Schmidt

[57] ABSTRACT

A floating fishing apparatus has a spinning reel within a body which float with the reel below the water line. A signalling device is at an upper portion of the apparatus well above the water line. A portion of the reel exposes and actuates the signalling device to indicate that there has been a strike. In addition, the apparatus may be configured for use as a buoy with the signalling apparatus exposed and the reel configured so that line does not let out.

18 Claims, 3 Drawing Sheets

FISHING BUOY

BACKGROUND OF THE INVENTION

1. Field of the Invention

The present invention relates to a floating ice fishing apparatus which can also be used as a marker buoy.

2. Description of the Prior Art

Devices used for ice fishing which can be left alone and which signal when there has been a strike of the line are well known. Such devices used for ice fishing must overcome several problems, one of the largest is to overcome freezing associated with the low temperatures of ice fishing. Conventional ice fishing tip-ups have drawbacks as the hole through the ice freezes over and the line will not trip the device when a fish strikes. The device itself may freeze up so that when the line does get pulled, the line may be frozen in the reel and the device will not trip. Tip-ups are also prone to wind-actuated trips, thereby giving false readings of strikes which have in fact not occurred. Such tip-up devices generally mount on the ice with line extending into the hole and are limited to use only in the winter.

Buoys and jug-type devices which attach to a line or which may be used as a marker are also well known. However, such devices do not adequately set the hook and have little utility for ice fishing, as they may not adapt to the ice and suffer from freeze-up problems.

A floating ice fishing apparatus of the prior art is represented by U.S. Pat. No. 5,005,310 to Rinehart. However, the Rinehart apparatus suffers from many of the shortcomings of other tip-up devices. The Rinehart device still may be prone to freezing of the line. It is also prone to being tripped due to the wind and although the device floats, it may not float in the standard 6 or 7 inch diameter hole which is drilled in the ice. Furthermore, the apparatus is not well suited for use as a buoy or marker in the non-winter months.

It can be seen then that a fishing apparatus is needed which can be used in ice fishing which avoids freeze-up problems and is not prone to being tripped due to wind. It can also be seen that the utility of such a fishing apparatus would be increased if it could also be used in the summer months for fishing or as a marker buoy. Such a device would also be more useful if it had a reel such that line could be let out and had some resistance so that it would be more likely to set the hook when there is a strike and which can have the reel take line up without freezing.

SUMMARY OF THE INVENTION

The present invention is directed to a fishing device, particularly a fishing device used for ice fishing and which can also be used as a marker buoy. The fishing apparatus is configured to float in an ice fishing hole or in the open water, with the line contained in the reel below the surface of the water and a signalling device extending well above the water.

A reel containing a substantial length of line is mounted within the body of the fishing apparatus such that the reel will be well below the waterline when the apparatus is floating. In this manner, problems associated with the line or the reel freezing are avoided. The reel spins and can be rotated so that the line will be let out when pulled. In addition, accessible fingerholes at the bottom of the reel allow a user to manually rotate the reel to either let line out or take it in.

A signalling device is within the body at an upper portion of the apparatus. The device rotates to signal that line is being let out and is actuated with rotation of the reel. A cover hides the signalling portion of the device until there has been a strike, at which point the cover slides and exposes the signalling portion.

The signalling portion is exposed with the initial rotation of the reel and then continues to rotate as long as the reel is spinning. A rod supporting the signalling device connects to magnets at a lower portion thereof above a pair of magnets mounted to the reel. The supporting rod is caused to rotate with rotation of the reel by the effect of the first pair of magnets mounted to the reel on the second pair of magnets mounted with the rod. The magnets' pull provides some slippage and acts as a drag so that as the distance between the magnets is increased, the magnetic force is decreased and the resistance, or drag, on the line is decreased as well. In addition, since the apparatus floats, there is some give when there is a strike on the line so that the buoyancy helps to set the hook.

The rotational portions or moving parts of the apparatus are either below the waterline a sufficient distance so that they do not freeze or are in a watertight portion of the apparatus so that freezing does not have any effect on operation. It will be appreciated that with the present invention, the hole may freeze around the apparatus and it will still function to signal that there has been a strike on the line.

In addition to being rigged for fishing, the reel may be set so that line may not be let out. The signalling device is left exposed and the device will float and act as a marker or buoy. Weight is simply placed on the end of the line to retain the marker in position.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like referenced numerals indicate corresponding structures throughout the several views.

DETAILED DESCRIPTION OF THE PREFERRED EMBODIMENT(S)

Figure 1:
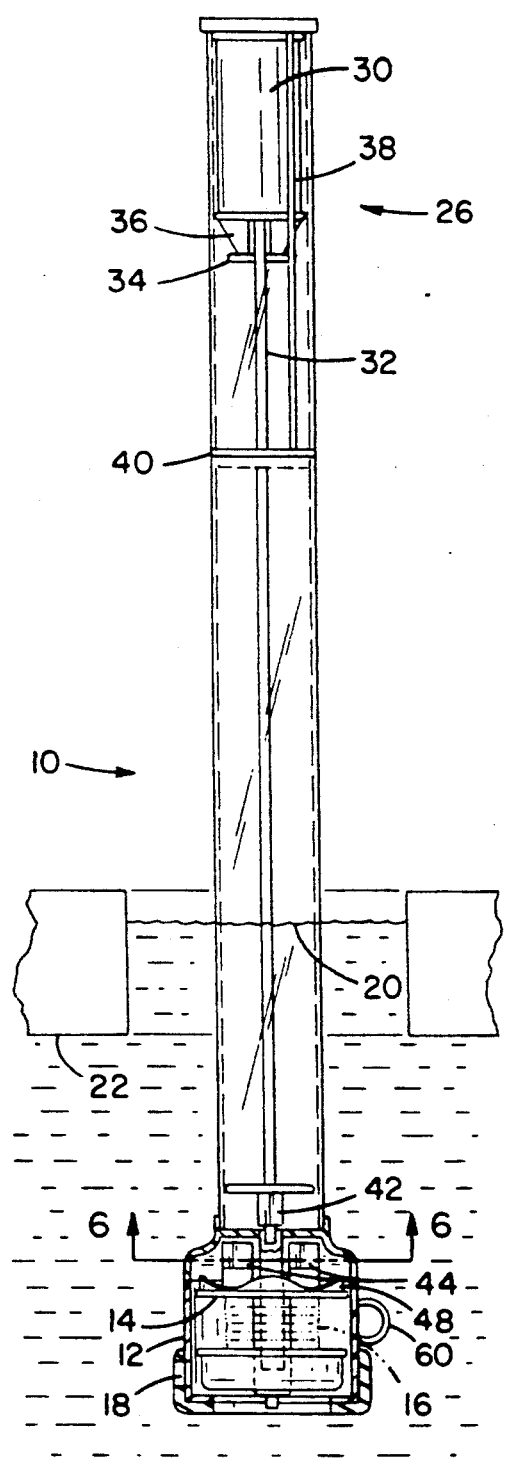
FIG. 1 shows an elevational view with a portion of the body removed of a fishing apparatus according to the principles of the present invention.

Referring now to the drawings, wherein like reference numerals designate corresponding structure throughout the views, and referring in particular to FIG. 1, there is shown a fishing apparatus 10 according to the principles of the present invention. The apparatus 10 has a body 12 which houses a spinning reel 14 and a signalling device 26. The body 12 traps a sufficient amount of air along a cylindrical portion so that the apparatus 10 has sufficient buoyancy to float in the water with the reel 14 containing fishing line 16 below the water line 20 and the signalling device 26 extending well above the water line 20. It can be appreciated that the diameter of the apparatus is sufficiently small so that the apparatus may be placed into a standard drilled 6 or 7 inch diameter hole in the ice 22.

With the reel 14 below the water line 20, the line 16 will not freeze as may occur with conventional tip-ups mounting on the ice around the hole wherein line leads from above the water line through the water line and below. Ice may form at the surface of the water so that line of conventional tip-ups often freezes up. In the present invention, the line 16, although wet, is maintained a sufficient distance below the water line 20 so that ice and freezing are not a problem. It can also be appreciated, as explained hereinafter, that even should the apparatus 10 freeze into an ice fishing hole, it will still function properly.

Figure 2:
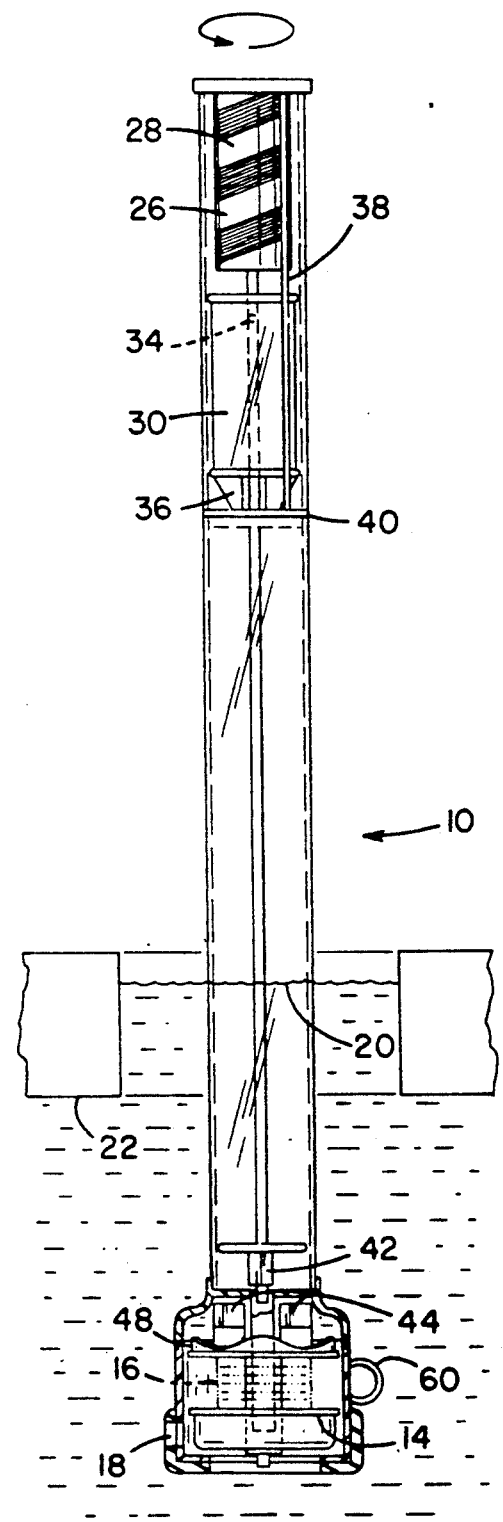
FIG. 2 shows an elevational view of the fishing apparatus shown in FIG. 1, with the signalling device actuated.

As shown in FIGS. 1 and 2, the signalling device 26 is located at the upper end of the fishing apparatus 10. The signalling device 26 includes a striped cylinder 28 and a cover 30 inside a substantially transparent portion of the body 12. The cover 30 surrounds the striped cylinder 28 until there has been a strike on the line so that the signalling device 26 is actuated. The cover 30 is prevented from rotating by engaging a groove 38 along the inside of the upper portion of the body 12. The cover 30 is supported on a pin 34 attached to rod 32. When the rod 32 is rotated, as will be explained hereinafter, the pin 34 and the cylinder 28 also rotate. A frusto-conical section 36 extends below the cover 30 and rests on the pin 34. The frusto-conical portion 36 slants inward and has two opposed portions removed so that the cover 30 will slide downward around the pin 34 when the pin 34 is rotated until the removed portions align with the pin 34. At that point, the frusto-conical portion 36 is not resting on the pin 34 and the cover 30 falls over the pin. This causes the cover 30 to slide down past the pin 34 until engaging a stop 40 located further down the body 12. The striped cylinder 28 is then exposed as shown in FIG. 2, thereby signalling that there has been a strike on the line.

As is further explained hereinafter, if line continues to be taken out by a fish, the rod 32 will continue to rotate, thereby also rotating the striped cylinder 28 so that it is readily apparent that line is being taken from reel 14. In this manner, by a quick glance at the signaling device 26, it can be determined whether there has been a strike, and if so, whether the fish is still taking line from the apparatus 10. Although a striped cylinder 28, preferably having a reflective surface, is shown, other signalling patterns and devices commonly known in the art may be used.

Figure 3:
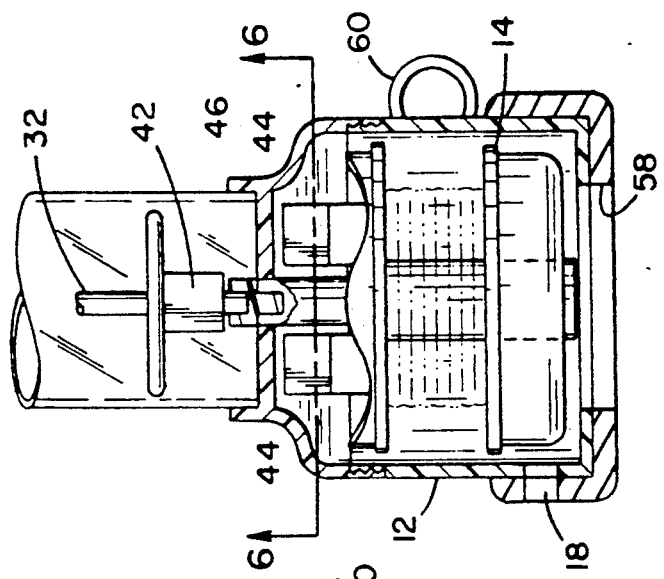
FIG. 3 shows an elevational view of the reel portion of the fishing apparatus with a portion of the body removed for clarity and the reel configured for use as a marker.
Figure 5:
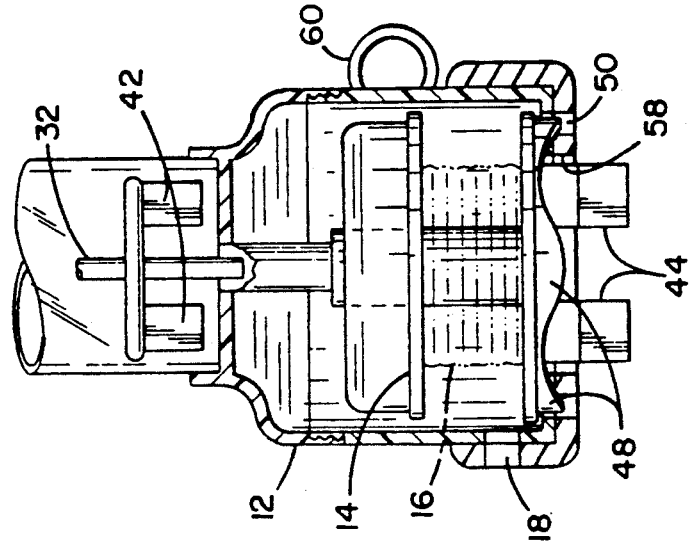
FIG. 5 shows a side view of the reel portion with a spacer added to decrease the drag.
Figure 7:
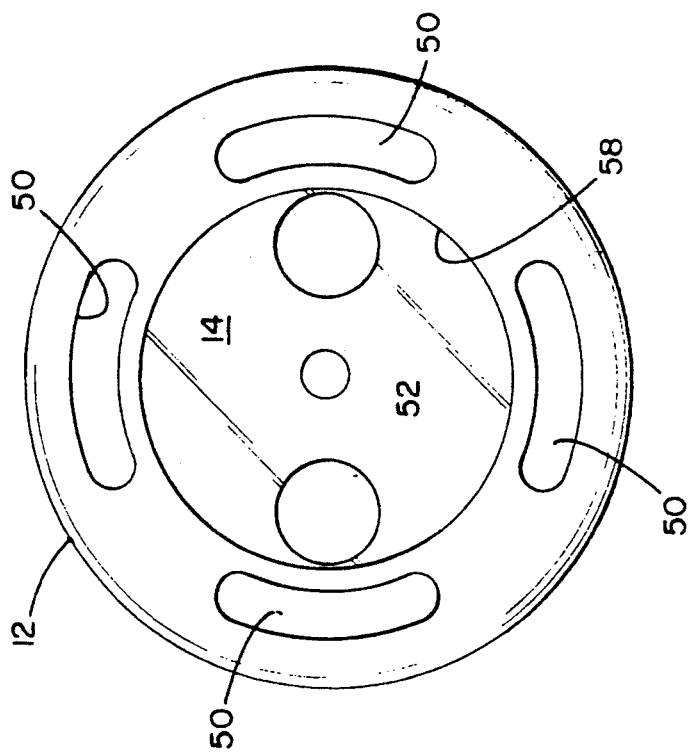
FIG. 7 shows a bottom view of the fishing apparatus.
Figure 6:
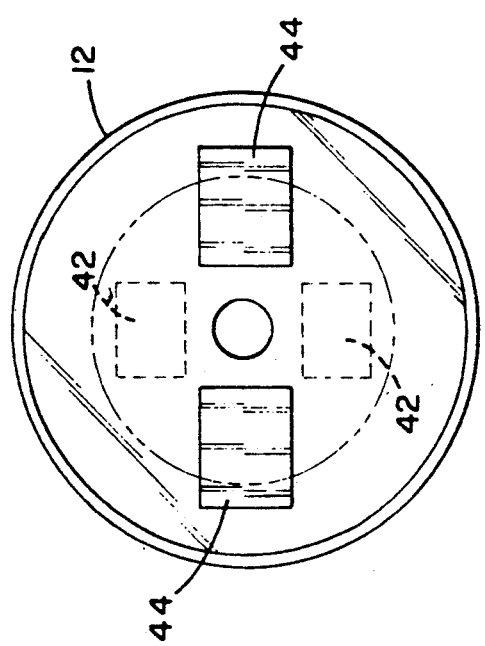
FIG. 6 shows a sectional view taken along line 6—6 of FIG. 5.

Referring now to FIGS. 3 and 5, there is shown the lower portion of the body 12 housing the reel 14. The reel 14 contains the fishing line 16 which is fed out through an opening 18 in the side of the body 12. The reel 14 has a pair of magnets 44 attached at an upper portion thereof which is used for drag and for actuating the signaling device 26, as will be explained hereinafter. Although line can be let out by a fish pulling, the reel 14 can also be rotated by inserting fingers into recesses 52 in the bottom of the reel 14 at lower opening 58 as shown in FIG. 7. This provides easy access to the reel 14, keeps moving parts to a minimum, and provides increased durability.

As shown in FIG. 3, in a first embodiment, the reel 14 can be removed by unscrewing a lower portion of the body 12. The apparatus can be configured for use as a marker buoy by turning the reel 14 upside down and reinserting into the body 12. Ridges 48 then insert into slots 50 at the underside of the body 12. When configured as shown in FIG. 3, the reel 14 cannot rotate so that line cannot be unwound from the reel 14. In this configuration, the apparatus 10 is rigged for use as a marker buoy wherein a weight is typically attached to the end of the line 16 and the signalling device 26 is exposed and easily visible.

Figure 4:
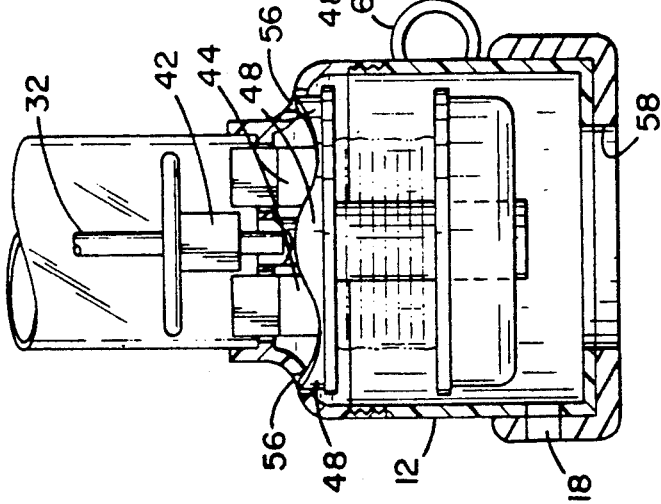
FIG. 4 shows an elevational view of a second embodiment of the reel portion of the fishing apparatus having the reel raised for use as a marker buoy.

As shown in FIG. 4, in a second embodiment, slots 56 are located above the reel 14 and the reel slides upward so that the ridges 48 engage the slots 56 to prevent the reel 14 from rotating. When the reel 14 is in a first lowered position, the reel 14 rotates, while the reel 14 remains stationary in a second raised position. The apparatus 10 easily converts between use for fishing and for use as a buoy or marker by raising or lowering the reel 14.

Referring again to FIGS. 1, 2 and 5, the apparatus 10 is shown configured for fishing. Referring to FIGS. 1 and 2 in particular, as the reel 14 rotates, magnets 44 mounted on the top of the reel also rotate. The magnetic field from the magnets 44 is sufficient to affect the magnetic field of magnets 42 which are mounted to rotate with rod 32. In the preferred embodiment, the magnet pairs 42 and 44 are mounted with like polarities adjacent so that each pair repels the other. With this arrangement, some slipping may occur so that small strikes do not necessarily trip the apparatus 10. It can be appreciated that as line 16 is pulled out due to a strike, the entire apparatus 10 which is floating may be pulled downward slightly. This provides for setting of the hook from the give due to the buoyancy of the apparatus 10. This function is not possible with the conventional tip-up devices mounting on the ice. In addition, if the force of the magnets is stronger than the flotational resistance, the signalling device 26 may not be actuated. Therefore, minor strikes and tugs due to live minnows will not cause false trips of the signalling device.

By varying the distance between the magnet pairs by inserting an adjusting peg 46 as shown in FIG. 5, the drag provided may be varied. As the magnet pairs 42 and 44 are placed further from one another, the pair 44 is more likely to spin freely without forcing the second pair of magnets 42 and its attached signalling assembly to spin. Therefore, the reel 14 is more likely to spin easily and will provide less resistance to a fish, in effect reducing the drag.

The fishing apparatus 10 may also be used as a large bobber or to fish off to the side when trolling by attaching the entire apparatus 10 to an additional line. The additional line is connected to a ring 60 mounted at the lower portion of the body 12. This provides for pulling in the apparatus 10 when used in open water and utilizes the advantages of signalling and drag.

It can be appreciated that the fishing apparatus 10 must be properly weighted and balanced so that it floats at the correct level in the water. Should the apparatus 10 float too high in the water, the reel 14 is likely to freeze up and will not function properly. If the apparatus 10 is floating too low in the water, the signaling device 26 will not be positioned high enough to be clearly visible. It can also be appreciated that with the air trapped in the body 12, the device has no water inside of it at the water line so that freezing is not a problem. All moving parts are either far enough below the water line that freezing is not a problem or are sufficiently placed above it and are dry so that freezing cannot affect the parts.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A floating fishing apparatus, comprising:
   a body floating with a portion above the waterline;
   a spinning reel for storing line below the waterline;
   signalling means enclosed in the body for signalling a hit on the line, wherein the signalling means is positioned above the waterline; and,
   signal actuating means enclosed in the body for actuating the signalling means upon taking out of line;
   wherein the signal actuating means comprises a rotatable support for supporting the signalling means, a first pair of magnets rotating with the support and a second pair of magnets rotating with the reel, wherein rotation of the reel rotates the second pair of magnets so that the second pair of magnets' magnetic field induces the first pair of magnets to rotate, thereby rotating the support.

2. A fishing apparatus according to claim 1, wherein the signalling means comprises a rotatable drum coupled to the reel so that upon turning the reel, the drum rotates.

3. A fishing apparatus according to claim 2, wherein the signalling means further comprises a cover sliding upward and downward over the rotatable drum, wherein rotation of the drum actuates downward sliding of the cover, thereby exposing the drum.

4. A fishing apparatus according to claim 1, wherein the signal actuating means comprises magnets mounted so as to rotate with the reel and magnets mounted so as to rotate with the rotatable drum, wherein the magnetic forces hold the signalling means at a non-signalling position.

5. A fishing apparatus according to claim 4, wherein the magnets are mounted so as to repel.

6. A fishing apparatus according to claim 1, further comprising finger actuated line take up means.

7. A fishing apparatus according to claim 6, wherein the finger actuated line take up means comprise a reel rotating in a substantially horizontal plane within the body, the reel having a plurality of recesses at a lower side, the body having a lower portion with an opening therein, wherein the recesses are accessible through the opening.

8. A fishing apparatus according to claim 1, further comprising means for attaching an external line to the apparatus.

9. A floating apparatus according to claim 1, wherein the signalling means comprises a rotating drum, wherein the drum spins with the reel.

10. A floating apparatus according to claim 9, wherein the signalling means further comprises a cover, the cover fitting around the drum and sliding off the drum upon rotating of the drum.

11. A floating apparatus according to claim 1, further comprising adjustable drag means for placing a variable resistance to taking out of line.

12. A floating apparatus according to claim 11, wherein the adjustable drag means comprises magnets mounted so as to rotate with the reel repelling magnets mounted with the signalling means and wherein the distance between the magnets may be adjusted.

13. A floating apparatus according to claim 1, wherein the reel is mounted in a first position to spin with a first side facing up and wherein the reel is mounted in a second position with a second side facing up to lock the reel.

14. A fishing apparatus according to claim 1, wherein the spinning reel is enclosed within the body.

15. A fishing apparatus according to claim 14, wherein the fishing apparatus is weighted so that the apparatus floats so that the reel is below the waterline and the signalling means and signal actuating means are above the waterline.

16. A fishing apparatus according to claim 1, wherein the first pair of magnets and second pair of magnets are mounted so that the magnet pairs repel.

17. A floating fishing apparatus, comprising:
    a body floating with a portion above the waterline;
    a spinning reel for storing line below the waterline;
    signalling means for signalling a hit on the line at a position above the waterline; and,
    signal actuating mean for actuating the signalling means upon taking out of line, wherein the signalling means includes a rotatable drum coupled to the reel so that upon turning the reel, the drum rotates, and wherein the signalling means includes a cover sliding upward and downward over the rotatable drum, wherein rotation of the drum actuates downward sliding of the cover, thereby exposing the drum.

18. A floating fishing apparatus, comprising:
    a body floating with a portion above the waterline;
    a spinning reel for storing line below the waterline;
    signalling means for signalling a hit on the line, at a position above the waterline;
    signal actuating means for actuating the signalling means upon taking out of line; and
    finger actuated line take up means, including a reel rotating in a substantially horizontal plane within the body, the reel having a plurality of recesses at a lower side, the body having a lower portion with an opening therein, wherein the recesses are accessible through the opening.

* * * * *